April 7, 1970          J. L. McCONNELL          3,504,530
DEVICE FOR MEASURING DYNAMIC SURFACE TENSION
Filed April 6, 1966          3 Sheets-Sheet 3
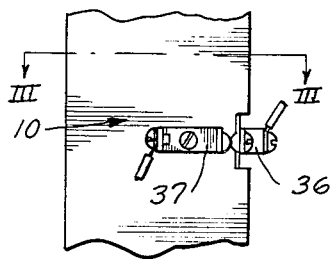
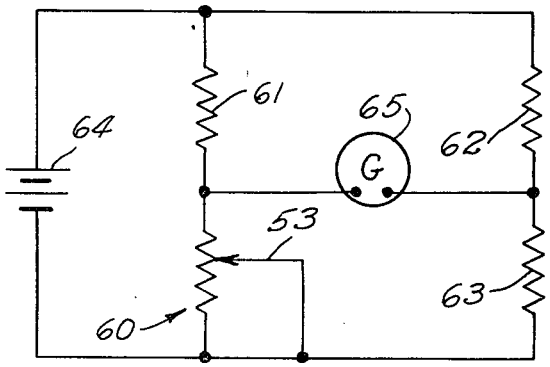
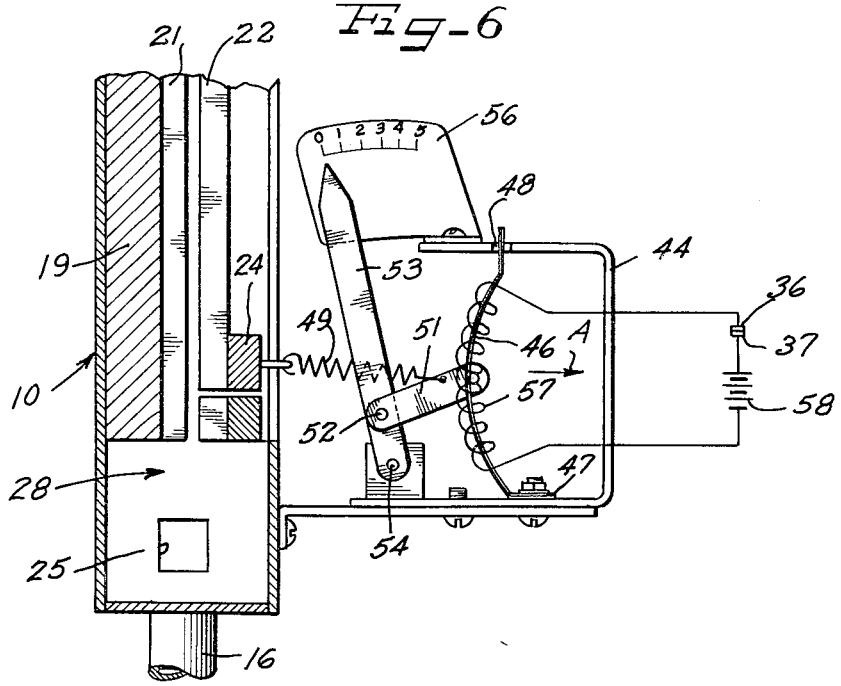
INVENTOR.
James L. McConnell
BY    ATTORNEYS

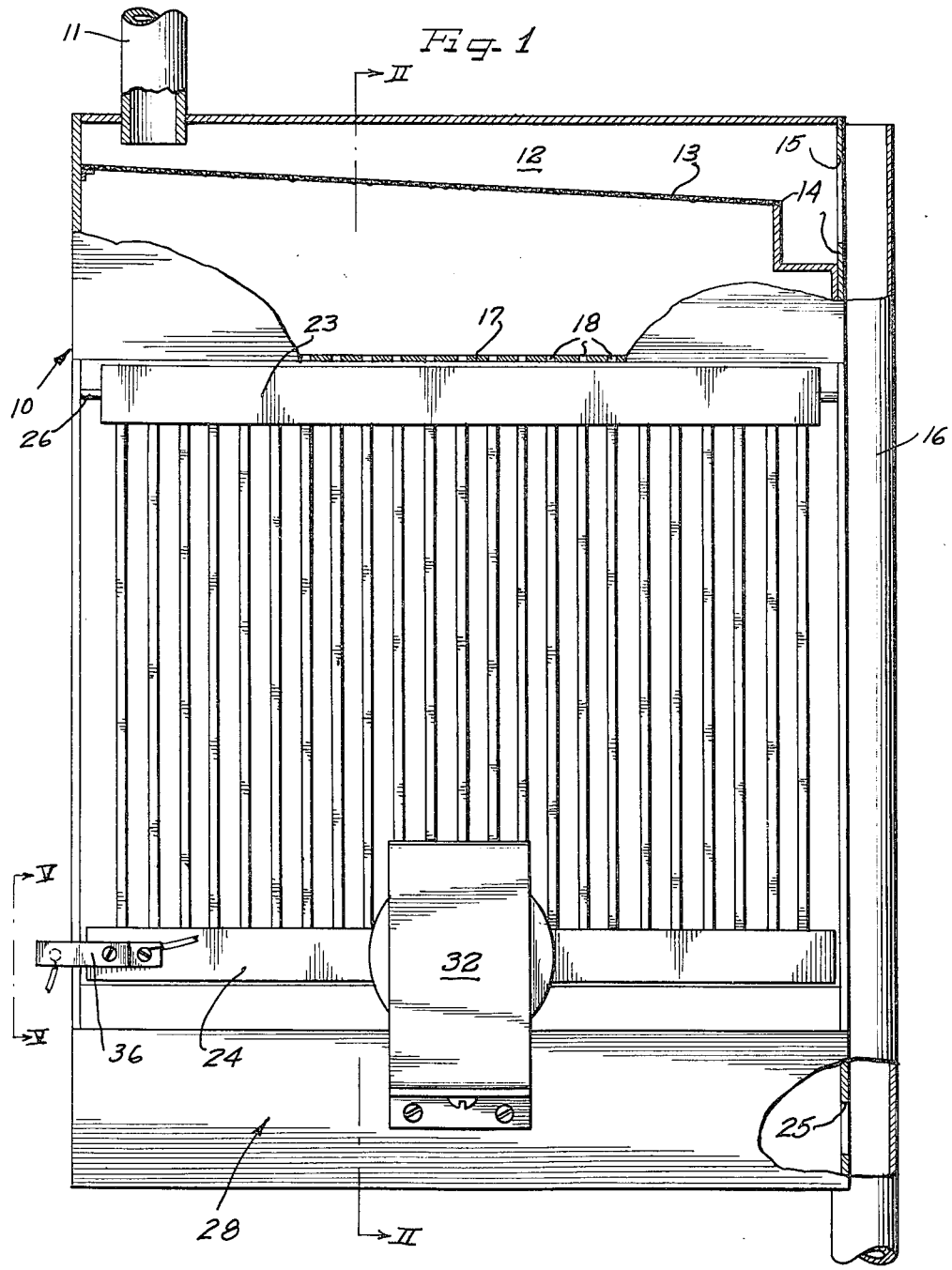

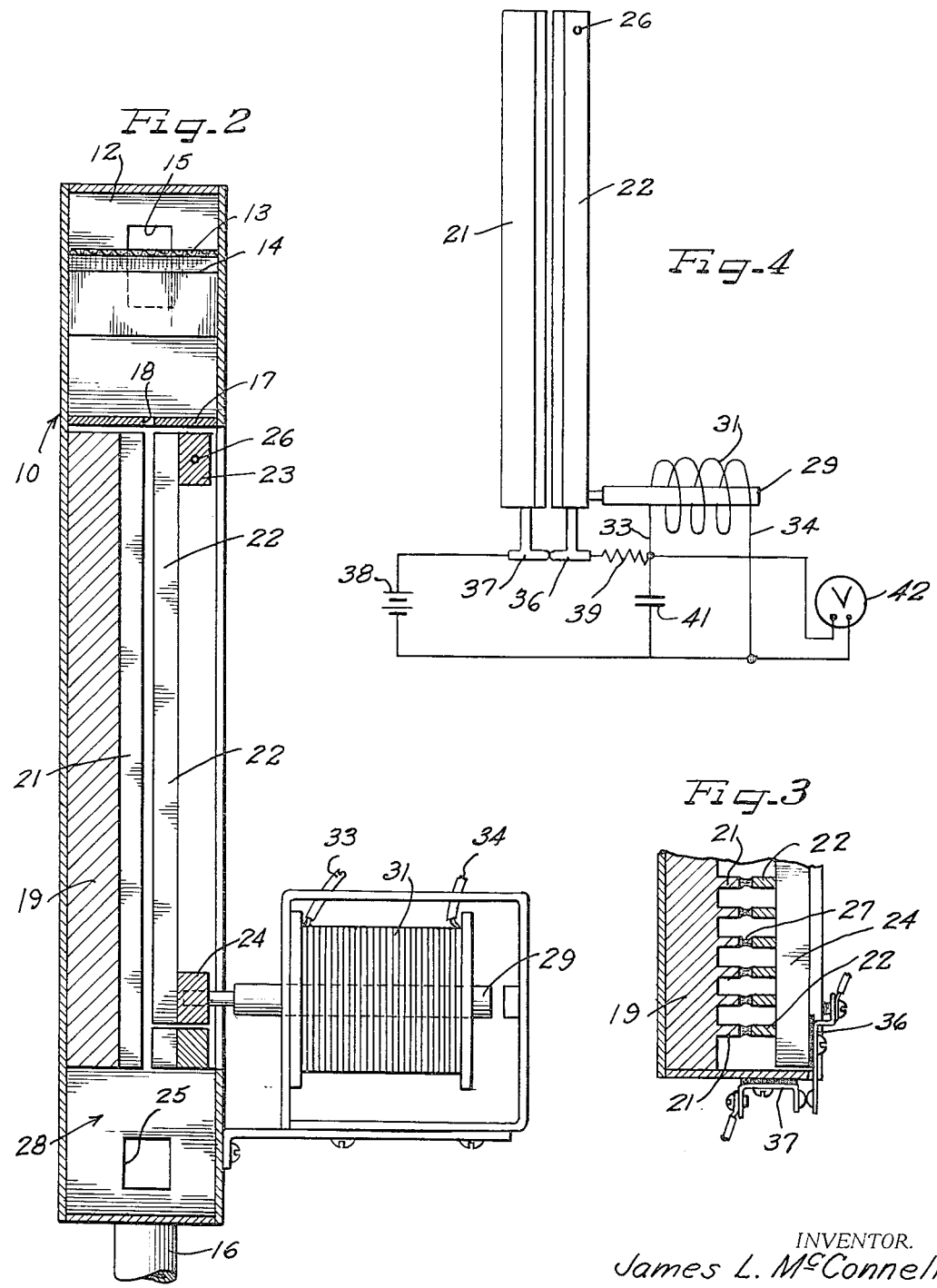

United States Patent Office

3,504,530
Patented Apr. 7, 1970

3,504,530
DEVICE FOR MEASURING DYNAMIC SURFACE TENSION
James L. McConnell, Stevensville, Mich., assignor to Whirlpool Corporation, Benton Harbor, Mich., a corporation of Delaware
Filed Apr. 6, 1966, Ser. No. 540,580
Int. Cl. G01n 13/02
U.S. Cl. 73—64.4                    10 Claims

ABSTRACT OF THE DISCLOSURE

Method and apparatus for measuring the dynamic surface tension of a liquid wherein means are provided to form a continuously flowing film of liquid between at least one pair of members, one of which is fixed and the other is pivotally supported, the film bridging the space between the two so that the relatively movable member is drawn toward the stationary member by virtue of the surface tension of the film, and means for measuring directly the surface tension forces exerted by the liquid film to thereby provide a direct readout of the surface tension.

---

The present invetion relates to a device for measuring dynamic surface tension of liquids wherein a pair of confronting relatively movable members or bars having liquid flowing between them so that the variable forces tending to pull the members together as a function of the degree of tension formed in the liquid-air interfaces can be counteracted by controlled and measured forces calibrated as a function of dynamic surface tension.

The device of the present invention is useful for measuring dynamic surface tension characteristics of any type of liquid, aqueous or non-aqueous, wherein the surface tension varies periodically. It finds utility, therefore, in many industries such as brewing, petroleum, detergent, textile, metal dipping, distilling, paint and other liquid mixtures.

In the illustrative example of this disclosure, the device is used to measure detergency or the lack thereof in a laundry or rinsing liquid of a laundry apparatus.

One of the objects of the present invention is to provide an improved dynamic surface tension measuring device of simplified and more economical construction.

Another object of the invention is to provide a surface tension measuring device which provides direct readout of the surface tension of the liquid being tested.

A further object of the invention is to provide a dynamic surface tension testing device utilizing a magnetic sensing means which eliminates the necessity of temperature compensation.

Still a further object of the invention is to provide an improved dynamic surface tension measuring device which can be conveniently incorporated into laundry apparatus and the like for giving a direct readout of the amount of surface tension lowering occasioned by the addition of a detergent to the laundry liquid.

In accordance with the present invention, I provide a device for measuring the dynamic surface tension of a liquid which includes a pair of generally vertically aligned bars, one being stationary, and the other being pivoted at its upper end. The liquid to be tested is introduced between the bars at a constant head, the spacing between the bars being sufficienly small so that the liquid bridges the gap therebetween and the surface tension of the liquid tends to pull the pivoted bars towards the stationary one. The device includes switch means which are actuated by the relative movement between the stationary and pivoted bars, and electrical circuitry which is actuated by the switch means to give an indication of the extent of surface tension forces exerted by the liquid under test.

A further description of the present invention will be made in connection with the attached sheets of drawings in which:

FIGURE 1 is a side elevational view, partly in cross-section, illustrating a form of device which can be used in accordance with the present invention;

FIGURE 2 is a cross-sectional view taken substantially along the line II—II of FIGURE 1;

FIGURE 3 is a fragmentary cross-sectional view taken substantially along the line III—III of FIGURE 5;

FIGURE 4 is a somewhat schematic circuit diagram of the circuit employed in the embodiment illustrated in FIGURES 1 to 3 inclusive;

FIGURE 5 is a view taken substantially along the line V—V of FIGURE 1;

FIGURE 6 is a fragmentary cross-sectional view, partially schematic, of a different form of sensing device which can be used in accordance with the present invention; and FIGURE 7 is a circuit diagram of an electrical bridge circuit which can be used in place of the indicating means shown in FIGURE 6.

As shown in the drawings:

In FIGURE 1, reference numeral 10 indicates generally a frame structure which serves as a housing for the surface tension sensing elements of the present invention. The upper end of the frame 10 is supplied with the liquid to be tested through an inlet conduit 11 which delivers the liquid to a liquid chamber generally indicated at reference numeral 12 in the drawings. A screen 13 is disposed in the liquid chamber 12 to trap lint and other solid matter from the stream constantly entering the liquid chamber 12 through the inlet conduit 11. A constant head of liquid is provided for test purposes by providing a constant overflow system including a baffle 14, a discharge port 15 and an overflow drain 16. A plate 17 is disposed at the base of the liquid chamber 12, and serves to channel the liquid flow into orifices 18 provided therein.

As best seen in FIGURES 1 to 3, inclusive, the frame 10 has secured to it a rigid wall 19 which carries a plurality of bars 21 (FIGURE 3) in spaced relation. A plurality of comparable bars 22 are secured between a pair of cross supports, including an upper cross support 23 and a lower cross support 24, the upper cross support 23 being pivotally secured to the frame 10 by means of a pivot pin 26. The stationary bars 21 and the pivotally mounted bars 22 are in aligned, space opposed relationship directly beneath the orifices 18, so that as the liquid under test is introduced through the orifices 18, the liquid forms film 27 which bridge across the confronting bars 21 and 22, as best seen in FIGURE 3. At the bottom of the frame 10, there is a sump assembly generally indicated at reference numeral 28 where the liquid passing through the device is collected, and allowed to overflow into the discharge conduit 16 through a discharge port 25.

While the principles of the present invention are applicable to the use of a single pair of bars, one stationary and the other pivoted relative thereto, the amount of force available with a single pair is usually too small to be useful. Obviously, the force tending to pull the bars together is proportional to the surface tension. Since there are two films for each pair of bars, the force is doubled. The force is also proportional to the length of the bars. The force equation can be stated as:

$$F = 2rL$$

where:

F is the force in dynes,
L is the length in centimeters, and $r$ is the coefficient for the surface tension of the test solution in dynes per centimeter.

For a pair of bars ten centimeters long, the force generated by tap water would be approximately 1440 dynes or only about 1.5 grams. The addition of detergent to the water would reduce the value of $r$ from about 72 for tap water to about 50 for a typical wash solution, with a resultant reduction in force developed to the neighborhood of 1 gram. In order to provide more workable force levels, I prefer to embody a large number of pairs of bars 21 and 22 as shown in the drawings, thereby effectively increasing the length factor and proportionately increasing the force.

As the test liquid flows through the orifices 18 between the pairs of bars 21 and 22, the surface tension created by the film 27 tends to pivot the movable bars 22 toward the stationary bars 21. The magnitude of this force is measured, in the embodiment shown in FIGURES 1 to 5 inclusive, by an electromagnetic system. A soft iron core 29 is connected to the lower cross support 24 on which the movable bars 22 are supported. The core 29 is received within a coil 31 disposed within a housing 32 and secured to the frame 10. The coil is energized by means of leads 33 and 34. A switch contact 36 is secured to the movable cross support 24, and a second switch contact 37 is secured to the frame 10 as illustrated in FIGURES 3 and 5 of the drawings.

The operation of the sensing means is best illustrated in the schematic diagram of FIGURE 4. As the liquid film 27 tends to pull the movable bars 22 toward the stationary bars 21, the force exerted will be sufficient eventually to cause the contact 36 to touch the contact 37, thereby closing the electrical circuit. A power source such as a battery 38 applies a voltage to the coil 31 through the medium of a resistance-capacitor network consisting of a resistor 39 and a capacitor 41, the time constant of the circuit being quite high. A peak reading type voltmeter 42 is connected across the coil 31. When the contacts 36 and 37 are closed, the voltage builds up exponentially across the coil 31. At some particular voltage, a point of equilibrium will be reached where there is just sufficient magnetic field created by the coil 31 to overcome the force on the core 29 caused by the surface tension between the bars. At this equilibrium point, the contacts 36 and 37 will open to thereby interrupt the power supply to the coil 31 which in turn causes the contacts 36 and 37 to reclose. Thus, the system will go into oscillation at the point of equilibrium wherein contacts 36 and 37 rapidly and alternately open and close. The speed of contact oscillation and the presence of resistor 39 and capacitor 41 in the circuit smooth out the voltage across the coil thereby giving a continuous readout on the voltmeter 42 of the specific voltage required to equalize the surface tension forces between the bars 21 and 22.

A different type of readout system is provided with the assembly shown in FIGURE 6. The configuration of the stationary bars 21 and the movable bars 22 is the same as illustrated in the previous embodiment, except that the electromagnetic assembly shown in FIGURE 2 is replaced by an electromechanical assembly. To this end, there is provided a housing 44 having a normally bowed bimetallic strip 46 therein. One end of the bimetallic strip 46 is anchored as indicated at reference numeral 47 to the frame 44, while the other end is free to move through a slot 48 formed in the housing 44. A link 51 is pivotally connected at one end to the bimetallic element 46 and at the other end is connected through a pin 52 to a pointer 53 whose lower end is pivoted by means of a pin 54 to a stationary part of the housing 44. The pointer 53 cooperates with a scale 56 providing for a direct reading of the amount of displacement of the pointer 53. A coil spring 49 extends between the link 51 and the cross support 24.

The electrical circuit includes a heater coil 57 trained about the bimetallic strip 46, and a power source such as a battery 58. The contacts 36 and 37 which are closed by relative movement between the movable bars 22 and the stationary bars 21 are schematically represented in FIGURE 6.

When the contacts 36 and 37 are closed due to the existence of surface tension forces in the liquid film, power is applied to the heater 57, causing the bimetallic strip 46 to bow or warp in a direction indicated by arrow A shown in FIGURE 6. The movement of the bimetallic strip 46 to the right as seen in FIGURE 6 extends the spring 49 and causes the pointer 53 to move along the scale 56 by the action of the link 51. When the spring 49 has ben extended sufficiently to just overcome the surface tension, the contacts 36 and 37 open, interrupting the power being supplied from the battery 58. If the surface tension remains constant, the entire system will be in equilibrium, with just enough power being supplied to the heater to hold the bimetallic strip 46 and hence the spring 49 at just the proper distance to equalize the force of the surface tension. The mechanical inertia of the system is sufficient to prevent rapid fluctuation of the pointer 53, so that direct readout of the surface tension value can be made with this system.

The mechanical system shown in FIGURE 6 can also be used in conjunction with an electrical bridge circuit of the type shown in FIGURE 7. In this instance, however, the pointer 53 is used as the wiper arm of a rheostat 60 which constitutes the variable resistance in a conventional Wheatstone or Kelvin type bridge circuit. The other elements of the bridge circuit are standard resistors 61, 62 and 63. A source of potential such as a battery 64 is applied across two junctions of the bridge circuit, while a galvanometer 65 is applied across the other two junctions. Thus, movement of the pointer arm 53 serves to create an unbalance in the electrical bridge circuit, which unbalance can be read directly by means of the meter 65.

From the foregoing, it will be understood that the devices of the present invention provide a convenient means for measuring dynamic surface tension of a liquid. The sensing means employed does not require expensive equipment, while providing for direct readout of surface tension values or any arbitrary reading related to the surface tension of the liquid being tested. It will also be undrstood that, since the dynamic surface tension of a liquid is directly proportional to the concentration of detergent in the solution, the surface tension measuring device of this invention is well suited for use in a laundry apparatus where it is desirable to know the detergent content of both the wash and rinse liquids at various periods throughout the washing cycle.

It should be evident that various modifications can be made to the described embodiments without departing from the scope of the present invention.

The embodiments of the invention in which an exclusive property or privilege is claimed are defined as follows:

1. A device for measuring the dynamic surface tension of a liquid comprising
    a frame,
    a pair of members supported vertically in said frame, one of said members being fixed to said frame and the other being pivotally supported from its upper end to said frame, the spacing between said members being sufficiently small to permit a film of liquid to bridge therebetween,
    means for continuously introducing the liquid being tested between said members to thereby cause the pivotally mounted member to be drawn toward the fixed member by virtue of the surface tension of the liquid film,
    means biasing said pivotally mounted member away from said fixed member to thereby set up an equilibrium condition in opposition to the force created by said surface tension, and
    measuring means for measuring the forces produced by said biasing means at such equilibrium condition.

2. The device of claim 1 in which said measuring means includes switch means actuated by relative movement between said members, and electrical circuitry actuated by said switch means.

3. The device of claim 2 in which said electrical circuitry includes a magnetizable core secured to the pivotally supported member, a coil receiving said core therein, means for applying a voltage across said coil, and indicator means across said coil for indicating the voltage applied across said coil.

4. The device of claim 3 in which the voltage applying means includes a resistor-capacitor network.

5. The device of claim 2 in which said electrical circuitry includes a bimetallic strip, heater means about said bimetallic strip actuated by the closing of said switch means, and mechanical linkage means connecting said strip to the pivotally mounted member, said linkage means including an indicator means for indicating the amount of displacement of said bimetallic strip in overcoming the surface tension forces between said members.

6. The device of claim 5 in which said linkage means includes a spring between said bimetallic strip and the pivotally mounted member.

7. The device of claim 6 which includes a pointer actuated by movement of said bimetallic strip to indicate the amount of displacement of said strip.

8. A device for measuring the dynamic surface tension of a liquid comprising a frame, a pair of members supported vertically in said frame, one of said members being fixed to said frame and the other being pivotally supported from its upper end to said frame, the spacing between said members being sufficiently small to permit a film of liquid to bridge therebetween, means for continuously introducing the liquid to be measured between said members to thereby cause the pivotally mounted member to be drawn toward the stationary member by virtue of the surface tension of the liquid film, and means for measuring directly the surface tension forces exerted by said liquid film, said measuring means including switch means actuated by relative movement between said members, and electrical circuitry actuated by said switch means, said electrical circuitry including a bimetallic strip, heater means about said bimetallic strip actuated by the closing of said switch means, and mechanical linkage connecting said strip to the pivotally supported member, said linkage means including a plurality of resistances forming an electrical bridge circuit, an arm actuated by movement of said bimetallic strip and arranged to selectively short out a portion of one of said plurality of resistances, and a meter for measuring the changes in current flow across said bridge circuit caused by movement of said arm.

9. A device for measuring the dynamic surface tension of a liquid comprising:

a pair of spaced apart members capable of supporting a liquid film, at least one of which is movable, means for continuously flowing liquid between said members to form said liquid film therebetween, and means for measuring the forces exerted on said members due to the surface tension of said liquid film including an electromagnet having a winding and an iron core therein attached to the movable one of said pair of spaced members, a power source, circuit means for serially connecting said power source and said electromagnet, a pair of normally open electrical contacts connected by said circuit means to said electromagnet and respectively mounted on said pair of spaced members, said contacts closing in response to the forces exerted on said members to energize said electromagnet to overcome said forces and open said pair of contacts, and an electrical indicating device for measuring the energy required for effecting separation of said pair of contacts by said electromagnet.

10. A device for measuring the dynamic surface tension of a liquid comprising:

a frame, a first upright member, a second member spaced from and substantially parallel to said first member, and capable of supporting a film of liquid therebetween, means for fixedly mounting said first member on said frame, means connected to said frame for pivotally supporting said second member about an end thereof, means for continuously flowing liquid between said first and second members to form said film of liquid therebetween, said second member being movable relative to said first member in response to surface tension forces of said liquid film, and means for measuring directly the surface tension forces exerted on said first and second members due to the presence of said liquid film therebetween.

References Cited

UNITED STATES PATENTS

| 2,279,140 | 4/1942 | Kellen | 73—398 |
| 2,627,177 | 2/1953 | Vonnegut | 73—64.4 |
| 2,635,463 | 4/1953 | Pouradier et al. | 73—64.4 |
| 3,096,642 | 7/1963 | Peterson | 73—64.4 |
| 3,209,586 | 10/1965 | Tohyama | 73—141 |
| 3,150,518 | 9/1964 | Peterson | 73—64.4 |

LOUIS R. PRINCE, Primary Examiner

F. SCHOON, Assistant Examiner

U.S. Cl. X.R.

73—141